United States Patent [19]

Yu

[11] Patent Number: 5,061,772
[45] Date of Patent: Oct. 29, 1991

[54] PROCESS FOR MAKING COMB-SHAPED COPOLYMERS OF A MACROMOLECULAR MONOMER OF POLYLACTONE WITH TERMINAL ACRYLOYL UNSATURATION, AND COMPATIBLE BLENDS THEREOF

[75] Inventor: Simon H. Yu, Westlake, Ohio

[73] Assignee: The B. F. Goodrich Company, Akron, Ohio

[21] Appl. No.: 638,275

[22] Filed: Jan. 7, 1991

Related U.S. Application Data

[63] Continuation-in-part of Ser. No. 283,422, Dec. 12, 1988, Pat. No. 4,983,689, which is a continuation-in-part of Ser. No. 46,818, May 7, 1987, Pat. No. 4,791,189.

[51] Int. Cl.$^5$ .................. C08F 218/02; C08G 63/08; C08G 63/10
[52] U.S. Cl. .................................... 526/320; 526/266
[58] Field of Search ............................. 526/320, 266

[56] References Cited

U.S. PATENT DOCUMENTS 4,791,199  12/1988  Yu .......................................  528/355
4,983,689   1/1991  Yu .......................................  528/355

Primary Examiner—Morton Foelak
Attorney, Agent, or Firm—Alfred D. Lobo

[57] ABSTRACT

A comb-shaped polymer ("comb" for brevity) of a polymerizable olefinically unsaturated monomer, preferably a vinyl, styryl, or acryloyl monomer, and a macromolecular monomer of a polylactone having an acryloyl or metharcryloyl "head" is effected at low temperature in an emulsion or suspension polymerization process. The processes are capable of producing a comb with a hydrocarbon backbone and pendant polyactone chains, which comb has a number average molecular weight of at least 10,000 without the use of a co-solvent. A comb with such high mol wt is not produced with a conventional solution polymerization process. A compatible blend is produced of a comb having a backbone incompatible with a synthetic resin, on the condition the polyactone chains are long enough to be compatible in the resin. A compatible blend of first and second resins, irrespective of whether they are compatible with each other, is also produced using a comb in which the backbone is compatible with one of the resins. Such blends also result with a synthetic resin and a comb in which the pendant chains consist of a first block which has a polylactone structure, and a second block which has a polyether structure, or vice versa.

10 Claims, No Drawings

PROCESS FOR MAKING COMB-SHAPED COPOLYMERS OF A MACROMOLECULAR MONOMER OF POLYLACTONE WITH TERMINAL ACRYLOYL UNSATURATION, AND COMPATIBLE BLENDS THEREOF

BACKGROUND OF THE INVENTION

Cross-Reference to Related Application

This application is a continuation-in-part of Ser. No. 283,422 filed Dec. 12, 1988 which is U.S. Pat. No. 4,983,689, in turn, a continuation-in-part of Ser. No. 046,818 filed May 7, 1987.

This invention relates to a process for making a comb polymer ("comb" for brevity) by free radical polymerization of a macromolecular monomer ("macromer" for brevity) of a polylactone having an acryloyl or methacryloyl "head" group at one end, and a terminal group at the other end, a particular terminal group being a hydroxyl (OH) group, or one derived from a —OH group. Hereinafter the acryloyl and methacryloyl "head" groups are together referred to as "(meth)acryloyl" groups for brevity.

The (meth)acryloyl-headed polylactone macromer, which is essentially only olefinically monofunctional and has a number average molecular weight Mn greater than 1000 may also include chains of (a) polylactone to which a polyether chain is blocked, or (b) polyether to which a polylactone chain is blocked. Such macromers with polylactone, or poly(lactone-b-ether), or, poly(ether-b-lactone), or, poly(lactonel-b-lactone2) chains are formed as described in the parent and grandparent cases which are incorporated by reference thereto as if fully set forth herein. The macromer has substantially uniform molecular weight distribution, that is, a ratio of Mw/Mn which is less than 5.0, preferably less than 3.

This macromer of (i) polylactone, (ii) polylactone-b-polyether block copolymer, (iii) polyether-b-polylactone block copolymer, or (iii) polylactonel-b-polylactone2 block copolymer (structures I, II, III and IV herebelow) is then copolymerized through its head group with an olefinically unsaturated copolymerizable monomer in a suspension or emulsion polymerization process. The copolymerization of the macromer of block copolymer with one or more conventional olefinic monomers, preferably a vinyl, styryl or acrylyl monomer, generates a comb "polymacromer" with a saturated hydrocarbon backbone having polylactone, polylactone-b-polyether, or polyether-b-polylactone branches thus resulting in the comb (also referred to as a "graft" based solely on structure with no regard as to how it is derived) copolymer in which the pendant polyether (in structure II), or polylactone (structure III) blocks respectively are farthest from the backbone. Such copolymerization of the monofunctional macromer, or of block copolymer, to form comb copolymers, differs from graft copolymerization, in the sequence of formation of the backbone relative to the formation of the pendant unit in one case, and the graft unit in the other.

The hydroxyl-terminated macromer of polylactone has the structure

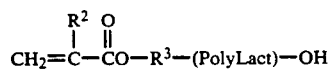

(I)

that of poly(lactone-b-ether) has the structure

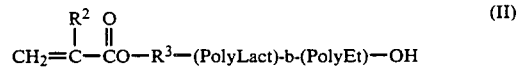

(II)

that of poly(lactone-b-ether) has the structure

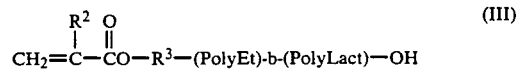

(III)

and, that of poly(lactone-b-lactone) has the structure

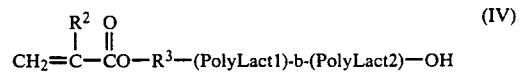

(IV)

wherein, the O of the OH group is contributed by the last repeating unit of the polyether or polylactone respectively;

$R^2$ is H or $C_1$–$C_{20}$ alkyl, preferably lower $C_1$–$C_5$ alkyl, and most preferably methyl;

$R^3$ is selected from a saturated group consisting of branched or linear alkylene, haloalkylene, alkoxyl, haloalkoxyl, each $C_1$–$C_{20}$, aralkylene, haloaralkylene, aralkoxyl, and haloaralkoxyl, each $C_7$–$C_{20}$;

(PolyLact) represents a chain of lactone units; and, (PolyEt) represents a polyether block containing no active hydrogen, i.e. no hydrogen attached to oxygen, nitrogen, or sulfur, and has a number average molecular weight (mol wt) Mn greater than 1000, up to about 30,000.

The most widespread use of a functionalized macromer is to form a copolymer with another comonomer, each comonomer being chosen to provide desirable physical and chemical properties in a particular polymer system in which, typically, the copolymer is blended.

For example, a commercially available hydroxyl-terminated lactone acrylate (TONE XM-101 or M-100, having 1 and 2 caprolactone repeating units respectively, see U.S. Pat. No. 4,504,635 to Weber et al) is used to prepare a porous copolymer of vinyl chloride in a suspension polymerization process taught in U.S. Pat. No. 4,871,780 to Sharaby. Other macromers, labelled M-0200 or M-0240 having 4–6 and 16–18 caprolactone repeating units respectively, were also used. But such macromers have distinctly different hydrophobicity, compared to that of the macromer used in my invention because of the relatively long pendant polylactone chains in the macromer I use. Further, Sharaby used a chain transfer agent to produce low molecular weight copolymers, believed to be less than Mn=10,000, with short pendant chains to enhance the porosity of the copolymer. When he used the M-0240 he still produced a porous copolymer with vinyl chloride (porosity=0.1), particularly compared with copolymers of vinyl chloride and vinyl acetate (porosity 0.02–0.07).

In the preparation of unplasticized blends of various synthetic resinous materials, relatively low molecular weight copolymers have limited utility, those with relatively long pendant chains being preferred because of the chain entanglement they provide upon blending. Such copolymers are not conveniently prepared by any known method for several reasons.

It was deemed highly unlikely that either the emulsion or suspension polymerization of the macromer (any of the foregoing macromers) having a Mn>1000, preferably above 3000, with an olefinic monomer, would proceed in a conventional free radical polymerization without a chain transfer agent because, inter alia, the macromer is often more hydrophobic than the commonly available olefinic monomers used to form combs, resulting in precipitation of the macromer out of the reaction media. To avoid such precipitation, a co-solvent was used in the prior art.

In either process, the macromer is insoluble in water and must be dissolved in the monomer with which it is to be copolymerized. However, as is well known, in the initial stages of an emulsion polymerization process specifically, the macromer must leave the monomer particles to allow the water-soluble initiator to initiate the reaction. Monomer and macromer must both diffuse into the nucleated polymer particles to replace that which has reacted. As the polymer particle increases in mol wt and grows in size containing some monomer as well, they together absorb more and more surfactant (to maintain stability) from that which is in solution. But this is difficult with a macromer having a relatively high mol wt and typically results in the formation of a coagulum instead of a stable emulsion.

Though one might expect to have some success with a suspension polymerization process to form the desired comb having a number average mol wt in excess of 10,000, the opposite is more likely to be true with an emulsion polymerization process. Confirmation of such an expectation is found in the statement "Emulsion polymerizations . . . have special value in forming finely divided, stable, latexlike dispersions useful directly for coatings, adhesives, etc., but are less suitable for preparing polymers of high purity free of emulsifiers, coagulating agents, and catalyst residues." (see High Polymer Series, Vol XXIX "Polymerization Processes" edited by Schildknecht and Skeist, pg 106, Wiley-Interscience 1977).

The expected difficulty with forming a desirable, essentially non-porous comb having a porosity less than 0.1, stems from using a macromer having a mol wt (determined by the hydroxyl number method) in excess of about 1000, preferably in excess of 3000, and does not depend upon how the macromer is formed. The macromer of such mol wt may be formed in commercially acceptable yield by any known cationic or carbocationic ring-opening polymerization of a lactone, provided its formation leaves the macromer with a (meth)acryloyl head group. Such processes are taught in the following references, inter alia.

U.S. Pat. Nos. 4,281,172 and 4,340,497 to Knopf, and U.S. Pat. No. 4,632,975 to Cornell, teach the preparation of macromers of polylactones by end-capping reactions.

U.S. Pat. No. 3,655,631 to Fraser, teaches that lactones are polymerized in the presence of an ethylenically unsaturated amide or ester with a strong organic acid such as halogen activated carboxylic acids or sulfonic acids as catalyst, and a compound having the formula L-CH$_2$OH as initiator, wherein L contains ethylenic unsaturation activated by amide or ester linkages, the ethylenic unsaturation being either CH$_2$=CH< or CH$_2$=CH—. The acid has a pK value of less than 3 in water at 25° C. An acrylic group is exemplified, but the determination of unsaturation of the (meth)acrylic groups by the iodine method is not reliable enough to determine unsaturation due to the (meth)acrylic groups. Further, as stated in U.S. Pat. Nos. 4,683,287 and 4,504,635, the macromers prepared according to Fraser's method necessarily contain a large amount of residual acid catalyst. The presence of such acid catalyst in the product likely produces degradation and decrease of shelf life or pot life of coating systems produced from the macromer.

In the '365 patent to Fraser, the resulting terminally unsaturated polylactones were copolymerized with an ethylenically unsaturated monomer, for example, vinyl acetate; the resulting comb was used as plasticizer for poly(vinyl chloride) (PVC). In Example 4 he teaches an emulsion polymerization of the macromer having a mol wt of about 960 (determined by the hydroxyl number method) with vinyl acetate. He added an emulsifying agent and potassium carbonate to a mixture of a major portion by wt of the vinyl acetate (to be used) and water, and buffered the mixture to pH 3.8-4.0 with glacial acetic acid. The macromer of polylactone was dissolved in the remaining minor portion of vinyl acetate and added to the reaction mixture over 2 hr while a solution of ammonium persulfate was also added. An emulsion of 55% solids is said to be obtained, but the solids were never characterized. There is no indication whether the emulsion obtained was stable, or whether the solids were precipitated as coagulum. Most of all, because Fraser was interested in making a coating which typically requires a relatively low mol wt polymer, there is no reason to believe he made a high mol wt comb.

Nor is the Fraser teaching as to forming a comb with any ethylenically unsaturated group as broadly applicable as at first appears. For example, when the ethylenically unsaturated group is a vinyl ether group, the alkenyl alcohol, such as 2-hydroxyether vinyl ether (CH$_2$=CH—O—CH$_2$—CH$_2$OH) or 4-hydroxybutyl vinyl ether, is an ineffective propagator. The vinyl ether group of the alkenyl alcohol does not survive under the conditions of cationic ring-opening polymerization of lactones and undergoes carbocationic polymerization. As a result, the lactone polymers do not have an ethylenically unsaturated head group.

U.S. Pat. No. 4,188,472 to Chang, discloses the polymerization of lactone in the presence of hydroxyalkyl (meth)acrylate with tetrabutyl titanate as the catalyst at 130° C.

U.S. Pat. No. 4,368,320 to Aldinger, discloses the polymerization of lactone in the presence of hydroxyalkyl (meth)acrylate with dialkyl tin oxide or glycolate at a temperature of from about 110° C. to about 125° C.

To cope with the problem of residual catalyst and minimize its effect, U.S. Pat. Nos. 4,504,635 and 4,683,287 to Weber, Jr. and Koleske, respectively, disclose the polymerization of lactone in the presence of hydroxyalkyl (meth)acrylate with less than 200 ppm of catalyst. Preferred catalysts are stannous octoate, dibutyl tin dilaurate, and other tin compounds; also, alkyl titanates such as butyl titanate. But the reaction has to be carried at a temperature in the range from about 100° C. to about 140° C., and though less than 2% by wt of diacrylate is said to be formed, no mention is made as to how this level of diacrylate was determined.

UK Patent Application GB 2,101,121A to Okitsu and Watanabe discusses numerous attempts to polymerize a lactone and obtain a polylactone-modified acrylic polyol.

Most preferred because of its effectiveness in the formation of the macromer is an oxonium salt catalyst found effective in the parent case.

As might be expected, the foregoing processes for providing the macromer produce diverse macromers some of which are more amenable than others for use in the production of the comb with desirable mol wt. It is not narrowly critical how preferred macromers are made, or whether they are OH terminated, or otherwise end-capped, provided they are effective to produce the combs of this invention.

SUMMARY OF THE INVENTION

It has been discovered that a suspension or emulsion polymerization process may be used to prepare an essentially non-porous comb copolymer having a number average molecular weight in excess of 10,000, the comb being formed with a polymerizable olefinically unsaturated monomer and a macromer of polylactone, the macromer having an unsaturated acryloyl or methacryloyl (together "(meth)-acryloyl") head group at one end and a terminal group at the other. Because of a relatively low polymerization temperature in a non-acidic reaction medium (slightly basic - pH in the range from 6 to 8), there is insignificant thermal self-polymerization of the (meth)acrylic head group. The polymerization proceeds by free radical polymerization, preferably in the presence of a redox catalyst for an emulsion polymerization, and the terminal group of each pendant polylactone-containing chain is preserved.

It is therefore a general object of this invention to provide both, a suspension and an emulsion polymerization process for the manufacture of a comb copolymer of (i) a macromer of polylactone having a number average mol wt greater than 1000 and an (meth)acryloyl functional head group and a terminal group at the tail, and (ii) a free-radical polymerizable olefinically unsaturated monomer, whereby the comb formed has a porosity less than 0.1 and a number average mol wt Mn greater than 10,000, preferably in the range from $10^5$ to $10^6$.

It is a specific object of this invention to provide an emulsion polymerization process for producing the foregoing comb, comprising, (a) preparing in a premix vessel, an aqueous non-acidic premix comprising a first surfactant in the absence of a co-solvent, (b) preparing in a reaction vessel, an aqueous non-acidic reactor precharge comprising a redox catalyst and second surfactant, different from the first surfactant, and an electrolyte in amount sufficient to maintain a desirable ionic charge balance in the absence of a co-solvent, (c) dissolving a macromer of polylactone having a mol wt greater than 1000 in the monomer only, to form a solution of macromer in monomer, the amount of monomer being sufficient to provide on average at least 2, preferably from 5 to 100 repeating units of monomer(s) per macromer unit in the comb copolymer to be formed, and adding the solution to the premix while agitating and purging the premix vessel with an inert gas, (d) adding a minor portion by volume of the premix to the reaction vessel, (e) initiating polymerization in the absence of a chain transfer agent, by adding sequentially to the reaction vessel a surfactant, reducing agent, oxygen scavenger and hydroperoxide catalyst ineffective at a temperature less than 70° C. in the absence of a redox catalyst, (f) adding remaining premix in incremental quantities to the reaction vessel until polymerization is essentially completed while maintaining the contents of the reaction vessel in an emulsion at a temperature less than 70° C., preferably in the range from 40° C. to 60° C., (g) coagulating the emulsion with a salt to produce a coagulum of comb copolymer, and, (h) recovering the comb copolymer having a porosity less than 0.1 and pendant chains of substantially equal length.

It is a specific object of this invention to provide a suspension polymerization process for producing the foregoing comb, comprising, (a) preparing in a reaction vessel, an aqueous non-acidic premix comprising a suspension agent in an amount sufficient to maintain a dispersion of microspheres of said monomer and macromer, and a first alkali metal-containing base, in the absence of a co-solvent, (b) agitating said premix while adding a solution of said macromer in said polymerizable monomer, the amount of monomer being sufficient to provide, on average, at least 2, preferably 5 to 100 repeating units of monomer per macromer unit in the comb copolymer to be formed, (c) adding a free radical catalyst effective at a temperature below about 70° C. in an amount sufficient to form the comb copolymer at a temperature less than 70° C., and initiating polymerization in the absence of a chain transfer agent, and, (e) recovering the polymer in an essentially non-porous form having pendant chains of substantially equal length.

It has also been discovered that the foregoing comb having a hydrocarbon backbone, made either by a suspension or an emulsion polymerization process has a sufficiently high mol wt to form a compatible blend with a synthetic resinous material which is incompatible with the hydrocarbon polymer backbone alone, but compatible with the pendant polylactone chains of the comb. By compatible blend, I mean a blend which has mechanical cohesion. Such cohesion is evident upon formation of the blend, and processing it. Such compatible blends may have separately identifiable phases, or a single phase when there is miscibility of the components.

It is therefore a general object of this invention to provide a compatible blend of the foregoing comb with a polymer which is incompatible with the hydrocarbon polymer having the structure of the comb's backbone, but is compatible with the pendant polylactone chains of the comb.

It has further been discovered that the foregoing comb with a hydrocarbon backbone, made either by a suspension or an emulsion polymerization process, has a sufficiently high mol wt to form a compatible blend with first and second synthetic resinous materials irrespective of whether they are compatible with each other, provided at least one one the materials is compatible with the pendant polylactone chains of the comb.

It is therefore a general object of this invention to provide a compatible blend of the foregoing comb with first and second polymers, at least one of which is compatible with the pendant chains of macromer; the polymers may both be compatible with each other and with the comb, which latter provides desirable improvement in physical properties; and, in still another instance, one of the polymers is compatible with the hydrocarbon polymer having the structure of the comb's backbone, and the other is compatible only with the pendant polylactone chains of the comb.

It is another specific object of this invention to provide a crosslinked comb copolymer of said macromer to produce a very high molecular weight network which nevertheless has compatibility, but with limited miscibility, sufficient to disperse domains of said crosslinked comb copolymer blended with a synthetic resinous material to improve impact resistance of the blend.

It is a specific object of this invention to provide the foregoing comb copolymer of a polymerizable olefinically unsaturated monomer and (i) a homomacromer of polylactone, (ii) random copolymers of at least one lactone, (iii) block copolymers of lactone-b-ether, or, of ether-b-lactone, with a polymerizable olefinically unsaturated monomer, provided the comb is made by the aforedescribed emulsion polymerization process. The comb is useful in a wide range of synthetic resinous materials of commercial importance, for example, in (a) coatings, adhesives, inks, printing plates, and binders; (b) as compatibilizers and impact modifiers, processing aid and heat distortion temperature (HDT) improver in numerous polymers such as poly(vinyl chloride) (PVC), and polyblends, for example, of PVC with segmented copolyesters disclosed in U.S. Pat. No. .4,820,763 to Yang; and, the like.

DETAILED DESCRIPTION OF PREFERRED EMBODIMENTS

The polylactone macromer essentially free from di(-meth)acrylic species, is represented by the structure

$$R—(M)_m—Z \qquad (LM)$$

wherein R represents the residue of said alcohol having a (meth)acrylic group, the structure being written to emphasize the terminal group Z, M represents the polyester repeating unit of at least one said lactone which is ring-opened, m represents an integer in the range from 2 to about 500, more preferably from 2 to about 300, and, Z is the terminal group the identification of which depends upon the manner in which the macromer is produced, whether, for example, by ring-opening or end-capping.

The preferred end-capped macromer is represented by the structure

$$R—(M)_m—Z \qquad (LM)$$

wherein Z is the residue of an end-capping unit selected from the group consisting of —OR$^4$,

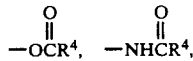

—OSiR$_3^4$, —Cl, —Br, —I, —OCH$_2$CH$_2$CN, —OSO$_3$Na, —OSO$_3$K, —OSO$_3$Li, —OSO$_3$NH$_4$, and the like, wherein R$^4$ is selected from the group consisting of hydrogen, C$_1$–C$_{20}$ alkyl and haloalkyl, and C$_6$–C$_{20}$ aryl and aralkyl.

The macromers of polylactones, end-capped or not end-capped, depending upon its structure, and the length of its chain, may be tailored to provide a wide variety of properties in polymers formed with them in subsequent polymerizations.

Comb copolymers of macromers of this invention may be derived from a macromer with one or more conventional ethylenically unsaturated monomers. The length to which the backbone is grown may be controlled by conventional means to provide the desired mol wt of the comb copolymer. It will be recognized that the length of each pendant polylactone chain is fixed by the mol wt of the macromer.

Monomers suitable for forming comb copolymers include:

(i) C$_2$–C$_{12}$ vinyl monomers such as readily available vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinyl toluene, vinylidene chloride, N-vinyl carbazole, and the like;

(ii) C$_8$–C$_{16}$ styryl monomers such as styrene, 4-chlorostyrene, alpha-methyl styrene, and the like;

(iii) alpha,beta-ethylenically unsaturated carboxylic acids having from 3 to 8 carbon atoms, and derivatives thereof selected from the group consisting of esters of C$_1$–C$_{20}$ alcohols such as ethyl acrylate, ethyl methacrylate, glycidyl acrylate, butyl acrylate; acrylamide and amides of C$_1$–C$_{20}$ amines such as N,N-dimethylacrylamide; and, metal salts such as sodium acrylate;

(iv) C$_4$–C$_8$ diene monomers such as butadiene and isoprene; and, (v) C$_5$–C$_{10}$ allylically unsaturated monomers such as allyl acetate, and diallylphthalate.

A preferred macromer is produced under mild conditions, by the cationic ring-opening polymerization of a lactone in conjunction with an alcohol and using an oxonium salt as the cationic ring-opening catalyst, as described in the parent case.

The cationically ring-openable lactone has the structure:

wherein, n is an integer chosen from 1, 3, 4 and 5;

R$^1$ is a group selected from hydrogen, C$_1$–C$_{20}$ alkyl (having from 1 to about 20 carbon atoms), preferably C$_1$–C$_6$ lower alkyl, cycloalkyl, alkoxy and phenyl, and the number of R$^1$ groups which are H is at least (n+2).

In the ethylenically unsaturated primary or secondary (meth)acryloyl alcohol used, the ethylenic unsaturation is adjacent a carbonyl group as in the structure

wherein R$^2$ and R$^3$ have the connotation hereinabove.

Most preferred among the lactones having structure (L), are the seven-membered rings, such as epsilon-caprolactone wherein n is 4, and at least 6 of R$^1$s are H, with the remainder of the R$^1$s being substituents selected from those identified hereinabove, provided the total number of C atoms in the —(CR$^1_2$)$_4$—groups does not exceed 12. Preferred substitutents are C$_1$–C$_{12}$ alkyl, for example, monoalkyl epsilon-caprolactones like methyl epsilon-caprolactone, or a mixture of isomeric methyl epsilon-caprolactones, or a mixture of isomeric methyl epsilon-caprolactones with epsilon-caprolactone, and dodecyl epsilon-caprolactone; also, dialkyl epsilon-caprolactones in which the two alkyl groups are substituted on the same or different C atoms, but not both on the epsilon C atom; and, trialkyl epsiloncaprolactones in which two or three C atoms in the lactone ring are substituted, but the epsilon C atom is not substituted.

Also usable are lactones having more than 6 C atoms in the ring, such as zeta-enantholactone and eta-caprylolactone, but they are less preferred. Substituted and unsubstituted epsilon-caprolactone are obtained by oxidizing the corresponding cyclohexanone, and the zeta-enantholactone from cycloheptanone.

Most preferred is a lactone selected from the group consisting of epsilon-caprolactone, beta-propiolactone, beta-butyrolactone, and delta-valerolactone.

Macromers of this invention have a number average mol wt Mn in the range greater than 1000 to about 10,000, corresponding to having from about 5 to 50 monomer repeating units per macromer unit. When the macromer is made by ring-opening of the lactone as described in the parent application, the mol wt is controlled by the ratio of lactone to acryloyl alcohol.

Most preferred is a (meth)acryloyl alcohol selected from the group consisting of 2-hydroxyethyl (meth)acrylate, hydroxypropyl (meth)acrylate, and 4-hydroxybutyl (meth)acrylate.

Hydroxyl number (OH No.) was determined by acetylation with an acetyl anhydride-pyridine mixture according to ASTM D-4274 procedure and the end point is determined by automatic titration. The OH No. is defined as the milligram equivalent of KOH per gram of the macromer, where a mole of KOH is equivalent to one mole of OH group.

The macromer may also be represented by the structure

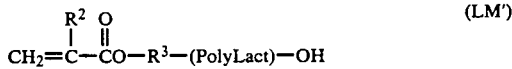

$$CH_2=C-CO-R^3-(PolyLact)-OH \qquad (LM')$$
with $R^2$ above C and O double-bonded above CO.

This macromer may be used to form a block macromer, by sequentially polymerizing a ring-openable cyclic ether, using the same catalyst, to produce a macromer block copolymer in which a polyether block spaces the OH group from the polylactone chain, the macromer block copolymer having the structure

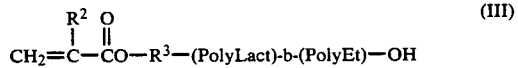

$$CH_2=C-CO-R^3-(PolyLact)-b-(PolyEt)-OH \qquad (III)$$

wherein, the O of the OH group is contributed by the last repeating unit of the polyether.

A random comb-shaped copolymer of macromer is prepared by polymerizing (a) the macromer of polylactone (LM') with an olefinically unsaturated monomer so as to have the structure

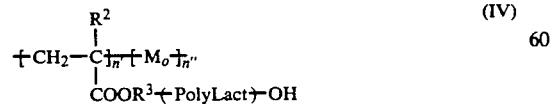

$$+CH_2-C\overline{)_{n'}}+M_o\overline{)_{n''}} \qquad (IV)$$
$$COOR^3+PolyLact\overline{)}-OH$$

wherein $M_o$ represents the olefinically unsaturated monomer;

n' represents an integer in the range from 1 to about $10^4$, preferably $1-10^3$ and refers to the number of pendant OH-terminated polyester chains; and, n" represents an integer in the range from 1 to about $10^5$, more preferably $1-10^4$; and, (b) the macromer block copolymer with an olefinically unsaturated monomer so as to have the structure

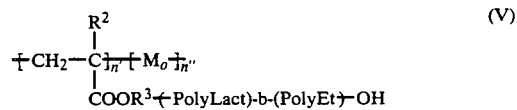

$$+CH_2-C\overline{)_{n'}}+M_o\overline{)_{n''}} \qquad (V)$$
$$COOR^3+PolyLact)-b-(PolyEt)-OH$$

The (meth)acryloyl polylactone macromer may be formed with more than one lactone (L) in a manner analogous to that used for the foregoing examples, to form macromers of random copolymers of the lactones used. The (meth)acryloyl macromer of at least one polylactone may also be used as the propagator to form block copolymers of lactone-b-lactone or lactone-b-ether by the action of the same cationic ring-opening catalysts identified hereinabove, under analogous, mild reaction conditions.

When the (meth)acryloyl-functional macromer of at least one polylactone is used as propagator, one can prepare macromers of block copolymers of lactone-b-lactone having the structure

$$CH_2=C-COCH_2CH_2O-(PolyLact1)-b-(PolyLact2)-OH \qquad (VII)$$

when different lactones are sequentially polymerized; or, of lactone-b-ether having the general structure

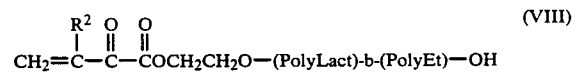

$$CH_2=C-C-COCH_2CH_2O-(PolyLact)-b-(PolyEt)-OH \qquad (VIII)$$

when a lactone and an alkylene oxide are sequentially polymerized.

Block copolymers having the structure (III) are prepared in which the polyether block has a number average molecular weight up to about 30,000, wherein PolyEt represents at least one cyclic ether such as:

(A) a 1,2-epoxide, for example (i) ethylene oxide, propylene oxide and the like; (ii) haloalkyl epoxides, for example, 1-chloro-2,3-epoxypropane (ECH), 3-chloro-4,5-epoxyoctane, and the like; and (iii) aliphatic or aromatic glycidyl ethers, for example, methyl glycidyl ether, ethyl glycidyl ether, phenyl glycidyl ether and the like;

(B) 1,3-epoxide, for example oxetane;

(C) a 1,4-epoxide, for example tetrahydrofuran (THF); and, (D) a 1,6-epoxide, for example oxepane (OXP).

1,4- and 1,6-epoxides do not homopolymerize but copolymerize with 1,2- or 1,3-epoxides.

For example, the macromer of block copolymer of monoacryloylethyl poly(lactone-b-ether) has the structure

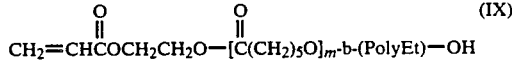

$$CH_2=CHCOCH_2CH_2O-[C(CH_2)_5O]_m-b-(PolyEt)-OH \qquad (IX)$$

wherein m is an integer in the range from 2 to about 500.

Other macromers of block copolymers may be made with a lactone and alkylene oxide of choice, such as caprolactone and propylene oxide, epichlorohydrin or tetramethylene oxide (THF), and any of the following conveniently available alcohols: methacryloylethyl alcohol, acryloylethyl alcohol, acryloylpropyl alcohol, and acryloylbutyl alcohol.

The terminal OH group of the lactone macromers (LM) and (VI) are in some cases required to be end-capped with an end-capping group so that there is no OH group to interfere with the subsequent utilization (in a reaction or copolymerization) of the double bond of the macromer. The end-capping group is not narrowly critical and a variety of esterification and etherification reactions may be used to cap the terminal OH groups, as for example disclosed in U.S. Pat. Nos. 2,998,409 and 3,507,927; British Patents Nos. 748,856; 848,660; 869,323; 877,256; 911,959; inter alia; or, by reacting with an alkylisocyanate as in British Patent No. 924,259; or, by reacting with diazomethane as in British Patent No. 894,439; or, by reacting with acrylonitrile or trialkylchlorosilane.

A preferred comb copolymer is made with a lactone macromer which contains the (meth)acryloyl head, and, one or more of the copolymerizable monomers preferably selected from (i)–(v), and more preferably from (i)–(iv). Free-radical chain polymerization, commonly used in the art, as described in "Encyclopedia of Polymer Science and Technology" Vol 7, Interscience Publishers, New York (1967), is preferred for all the polymerizations.

The catalyst chosen depends in part upon the particular monomers to be used and also upon the temperature at which the polymerization is to be carried out. It is preferred to carry out the polymerizations, whether in emulsion or suspension, at a temperature below about 70° C., though higher temperatures as high as about 90° C. may be used. In general, the higher the temperature of polymerization with the macromer, the lower the molecular weight of the comb formed. Preferred catalysts are the organic and inorganic peroxides, hydroperoxides, persulfates, perborates, the "redox" catalysts, and alkyl borane/oxidizing agent combinations, particularly those which are effective below 70° C. For emulsion polymerization, most preferred is a hydroperoxide catalyst which is ineffective below 70° in the absence of a redox catalyst.

Either in emulsion or suspension, the polymerization is best carried out in water in the presence of an effective suspending agent to obtain a granular comb polymer, or in the presence of an efficient dispersing agent to obtain a latex-like emulsion of polymer. Suitable suspending agents include the fatty alcohol sulfates, the alkarylsulfonates, and other such as sodium lauryl sulfate, sodium dodecyl benzene sulfonate, isobutyl naphthalene sodium sulfonate, the sodium salt of N-octadecyl-N-1,2-dicarboxyethyl sulfosuccinamate, and the like.

The preferred range for carrying out the polymerization is from about 40° C. to about 60° C.

Comb polymers formed with the macromer, and, an olefinically unsaturated monomer which provides a rubbery phase, such as ethyl acrylate, butyl acrylate or butadiene, optionally crosslinked to provide limited miscibility and to control the morphology of the elastomer, particularly to improve toughness or elasticity (elongation) in numerous commercially available polymers such as styrene/acrylonitrile, PVC and chlorinated PVC, poly(methylmethacrylate) and other polyesters, polycarbonates, polyacetals, polyurethanes and nylons. In the absence of pendant chains of polylactone, polyacrylates are not compatible with the resins, for example with PVC or polyurethane.

The comb copolymers may also be used to convert thermoplastic resins into thermoplastic elastomers; for example in styrene/acrylonitrile, PVC, polyurethane, polycarbonate, polyacetal and nylon.

The comb copolymers may further be used to modify the physical properties of known thermoplastic elastomers such as block copolymers of styrene-butadiene-styrene.

The comb copolymer is thus particularly useful as an impact modifier when it is compatibly blended with a synthetic resinous material present in a major amount by weight relative to the comb in the blend. As little as 1 part comb per 100 parts resinous material may be used, though larger amounts in the range from 1 to 40 parts, preferably from 5 to 30 parts, are more typically used. The compatibility of comb and resin in such a blend, is attributable to the miscibility or compatibility of domains formed by pendant chains of polylactone with the synthetic resinous phase. Additional miscibility, or greater compatibility of resin with such pendant chains may be obtained when the polylactone is blocked to polyether or vice versa, in the pendant chains.

Comb copolymers formed with the macromer, and, an olefinically unsaturated monomer, such as styrene, methyl methacrylate or alpha-methyl styrene which provides a rigid phase are useful as modifiers to improve HDT and/or physical strength in numerous commercially available resins. Such HDT improvement is obtained in a blend of PVC with the comb of macromer of polylactone and alpha-methyl styrene. The comb of macromer of polylactone and styrene improves physical strength in PVC.

Synthetic resinous materials which may be modified with the comb include the commonly available commercial polymeric materials. These include poly(vinyl chloride) ("PVC"), poly(styrene-acrylonitrile) ("SAN"), poly(styrene-acrylonitrile-butadiene) ("ABS"), poly(styrene-acrylonitrile-acrylate) ("ASA"), poly(vinyl acetate), poly(vinylidene chloride-vinylacetate), poly(vinyl methyl ether) ("PVME"), chlorinated poly(vinyl chloride) ("CPVC"), chlorinated polyethylene ("CPE"), Phenoxy (polyhydroxypropylether of bisphenol A), poly(methylmethacrylate) ("PMMA"), poly(styrene-maleic anhydride) ("SMA"), poly(ethylene-vinyl acetate) ("EVA"), polybutyleneteraphthalate ("PBT"), polyethyleneterephthalate ("PET"), polyacetal ("POM"), polyamide ("PA"), polyurethane ("PU"), polyolefin ("PO") and polycarbonate ("PC").

The comb is particularly useful as a compatibilizer to form a blend of a first synthetic resinous material with a second such material which may be structurally so different from the first as to be incompatible with it. By "incompatible" is meant that any physical blending of as little as 1 part of one resin with the other results in the resins having no mechanical cohesion, and remaining separate and distinct as long as there is no compatibilizing agent present. There is no compatibility of one with the other. The blending of the comb with the first and second resins, together present in a major amount by weight relative to the comb in the blend, results in the formation of a compatible blend which in some instances may also be an essentially homogeneous one. Formation of such a blend is attributable to the first material being compatible with domains formed by pendant chains of the polylactone. The compatibilization of the resins with the pendant chains of the comb results in some instances, in a fine dispersion of one polymer in another; in other instances, it results in desired morphology obtained during processing.

The comb polymer is therefore useful as a compatibilizer to improve the physical properties of numerous, commercially important compatible polyblends such as PVC/ABS; ABS/polycarbonate; ABS/nylon; PVC/acrylonitrilebutadiene copolymer; and the like, and facilitate obtaining the desired morphology.

The comb copolymers are also useful as compatibilizers for blending two or more incompatible polymers. For example, comb copolymers formed with macromer and butyl acrylate are useful to form a fine dispersion of poly(butyl acrylate) in PVC to improve toughness of the PVC. Another example is that of comb copolymers formed with macromer and alpha-methyl styrene which are useful to form a fine dispersion of poly(alpha-methyl styrene) in PVC which increases HDT of the PVC. Still other examples are that of the comb copolymer of macromer with vinyl chloride which leads to a fine dispersion of polyester in PVC to facilitate recycling of waste PVC; and, of the same comb which leads to formation of a compatible blend of polyolefins with PVC.

A comb of macromer of polylactone with a backbone of alkyl acrylate having methacrylic acid units is a reactive compatibilizer for nylon and a polyester such as polyethylene terephtalate ("PET"). Dynamic crosslinking may be obtained with the addition of diisocyanate as the crosslinking agent during blending. Thus the morphology of the blend can be controlled.

The following illustrative examples describe the preparation of comb copolymers with a specific macromer of caprolactone and several acrylates by emulsion polymerization. Glossary of identifying names and symbols used in the following examples:

Gafac PE-510—alkylphenoxy poly(oxyethylene) ethyl phosphate

Sequestrene NaFe—sodium ferric ethylenediamine tetraacetic acid

PCL—macromer of polycaprolactone

Daxad 17—sodium salt of polymerized alkyl naphthalene
sulfonic acid

PHMP—paramethane hydroperoxide

SFS—sodium formaldyhe sulfoxylate

Hampene 100—complexing agent for Fe

EXAMPLE 1

A premix was made by dissolving 20 g of a first surfactant, Gafac PE-510; and 0.1 g of a redox catalyst, Sequestrene NaFe in 750 ml demineralized water in a 2 liter premix flask. The pH was then adjusted to 6.5 with about 1 g of 50% caustic solution.

200 g of PCL macromer, Mn=3060, formed with 0.53 moles of hydroxyethylacrylate (HEA) and 17.54 moles of caprolactone, are dissolved in 800 g of ethylacrylate and 4 g of methacrylic acid. This solution is added to the premix with stirring to form an emulsion while the premix flask is purged with nitrogen.

To a 2-liter reaction flask equipped with a condenser and mechanical stirrer was added 487 ml of demineralized water, 5 g of Daxad 17, 3 g of sodium sulfate, and the premixed emulsion (269 g) of monomers from the premix flask. The reaction flask was then purged with nitrogen.

While under nitrogen, the reaction mixture was warmed to 45° C. and 0.47 g 55% active PHMP, 0.4 g SFS and 0.24 g of 35% active Hampene 100 were added so that the free radical polymerization was initiated. Then the remaining premix emulsion is proportioned into the reaction flask over a period of 3 hr with a metering pump. The total polymerization time is 5 hr and the temperature is maintained at 45° C.

A total solids content of 35.7% was obtained and indicated about 89% monomer conversion. The emulsion was coagulated with 2 wt % solution of Epsom salts in water. The isolated comb copolymer was washed with water and an antioxidant added before it is dried overnight at 60° C. The total weight of copolymer obtained was 854 g.

The copolymer has a Mooney viscosity of 22 (ML 11+4 at 100° C., ASTM D-1646) and a dilution solution viscosity of 1.64 g/ml as determined on a solution made up with 0.25 g copolymer in 100 ml methylethyl ketone (MEK). GPC analysis shows the copolymer has an average $Mn=2.6\times 10^5$ and the ratio of $Mw/Mn=2.4$. Thermal characterization shows that the copolymer has a glass transition temperature $T_g$ of $-13°$ C. and a melting temperature $T_m$ in the range 16°-82° C. with an estimated heat of fusion of 5.8 cal/g. The copolymer is soluble in toluene tetrahydrofuran (THF), MEK and methylene chloride.

EXAMPLE 2

In a manner analogous to that illustrated in the foregoing example 1, a premix was made by dissolving 13 g of Gafac PE-510; and 0.07 g of Sequestrene NaFe in 529 ml demineralized water in a 2 liter premix flask. The pH was then adjusted to 6.5 with about 0.65 g of 50% caustic solution.

130 g of PCL macromer, Mn=1264, formed with 1.51 moles of hydroxyethylacrylate (HEA) and 17.54 moles of caprolactone, are dissolved in 520 g of n-butylacrylate and 4.88 g of diethylene glycol diacrylate (Sartomer SR-230) to provide some crosslinking. Such crosslinking is provided to increase the mol wt and limit miscibility, and at the same time to provide dispersed domains which improve impact strength. This solution is added to the premix with stirring to form an emulsion while the premix flask is purged with nitrogen.

To a 2-liter reaction flask equipped with a condenser and mechanical stirrer was added 750 ml of demineralized water, 3.25 g of Daxad 17, 1.95 g of sodium sulfate, and the premixed emulsion (178 g) of monomers from the premix flask. The reaction flask was then purged with nitrogen.

While under nitrogen, the reaction mixture was warmed to 45° C. and 0.37 g of 55% active PHMP, 0.26 g SFS and 0.16 g of 35% active Hampene 100 were added so that the free radical polymerization was initiated. Then the remaining premix emulsion is proportioned into the reaction flask over a period of 100 mins with a metering pump. The total polymerization time is 5 hr and the temperature is maintained at 45° C.

A total solids content of 39% was obtained and indicated about 100% monomer conversion. The emulsion was coagulated with 2 wt % solution of Epsom salts in water. The isolated comb copolymer was washed with water and an antioxidant added before it is dried overnight at 60° C.

The copolymer has a Mooney viscosity of 54 (ML 11+4 at 100° C., ASTM D-1646). Thermal characterization shows that the copolymer has a $T_g$ of $-47°$ C. and a $T_m$ in the range 8°-73° C. with an estimated heat of fusion of 2.3 cal/g.

EXAMPLE 3

In a manner analogous to that illustrated in the foregoing example 2, a premix was made by dissolving 10 g of Gafac PE-510; and 0.05 g of Sequestrene NaFe in 529 ml demineralized water in a 2 liter premix flask. The pH was then adjusted to 6.5 with about 0.5 g of 50% caustic solution.

100 g of PCL macromer, Mn=1264, formed with 1.51 moles of hydroxyethylacrylate (HEA) and 17.54 moles of caprolactone, are dissolved in 400 g of 2-ethylhexyl acrylate and 3.75 g of diethylene glycol diacrylate (Sartomer SR-230) to provide some crosslinking. This solution is added to the premix with stirring to form an emulsion while the premix flask is purged with nitrogen.

To a 2-liter reaction flask equipped with a condenser and mechanical stirrer was added 375 ml of demineralized water, 2.5 g of Daxad 17, 1.5 g of sodium sulfate, and the premixed emulsion (137 g) of monomers from the premix flask. The reaction flask was then purged with nitrogen.

While under nitrogen, the reaction mixture was warmed to 45° C. and 0.27 g of 55% active PHMP, 0.2 g SFS and 0.1 g of 35% active Hampene 100 were added so that the free radical polymerization was initiated. Then the remaining premix emulsion is proportioned into the reaction flask over a period of 90 mins with a metering pump. The total polymerization time is 5 hr and the temperature is maintained at 45° C.

A total solids content of 39% was obtained and indicated about 100% monomer conversion. The emulsion was coagulated with 2 wt % solution of Epsom salts in water. The isolated comb copolymer was washed with water and an antioxidant added before it is dried overnight at 60° C. A total of 443 g of gummy copolymer was obtained.

Thermal characterization shows that the copolymer has a $T_g$ of $-63°$ C. and a $T_m$ in the range 9°–75° C. with an estimated heat of fusion of 2.1 cal/g.

EXAMPLE 4

In a manner analogous to that illustrated in the foregoing example 3, a premix was made by dissolving 10 g of Gafac PE-510; and 0.05 g of Sequestrene NaFe in 375 ml demineralized water in a 2 liter premix flask. The pH was then adjusted to 6.5 with about 0.5 g of 50% caustic solution.

125 g of PCL macromer, Mn=1160, formed with 0.14 moles of hydroxyethylacrylate (HEA) and 1 mole of caprolactone, are dissolved in 125 g of ethyl acrylate and 250 g of n-butyl acrylate. This solution is added to the premix with stirring to form an emulsion while the premix flask is purged with nitrogen.

To a 2-liter reaction flask equipped with a condenser and mechanical stirrer was added 375 ml of demineralized water, 2.5 g of Daxad 17, 1.5 g of sodium sulfate, and the premixed emulsion (133 g) of monomers from the premix flask. The reaction flask was then purged with nitrogen.

While under nitrogen, the reaction mixture was warmed to 45° C. and 0.42 g of 55% active PHMP, 0.2 g SFS and 0.12 g of 35% active Hampene 100 were added so that the free radical polymerization was initiated. Then the remaining premix emulsion is proportioned into the reaction flask over a period of 135 mins with a metering pump. The total polymerization time is 4.5 hr and the temperature is maintained at 45° C.

A total solids content of 32.6% (86% conversion) was obtained and indicated about 97% monomer conversion. The emulsion was coagulated with 2 wt % solution of Epsom salts in water. The isolated comb copolymer was washed with water and an antioxidant added before it is dried overnight at 60° C. A total of 457 g of comb copolymer was obtained.

Carbon-13 NMR shows the comb has a composition of 55 wt % n-butyl acrylate (n-BtA), 23 wt % ethyl acrylate (EtA), and 22 wt % caprolactone. The terpolymer has a Mooney viscosity of 43 (ML 11+4 at 100° C., ASTM D-1646). Rheometrics Mechanical Spectrometer at 1 rad/sec oscillation frequency shows the terpolymer has complex viscosities of $6 \times 10^8$ poise at $-30°$ C., $2.6 \times 10^6$ poise at 10° C., $6 \times 10^5$ poise at 50° C., $4 \times 10^5$ poise at 90° C., and $1.9 \times 10^5$ poise at 210° C. Thermal characterization shows that the copolymer has a $T_g$ of $-41°$ C. and a $T_m$ in the range 10°–75° C.

Instrumented Dart Impact Evaluation Tests with a Blend of Comb Terpolymer with Poly(vinyl chloride):

20 parts by weight of the comb terpolymer of macromer produced in Example 4, is blended with 80 parts by weight of Geon$^R$ 87426 poly(vinyl chloride) on a two-roll mill at about 300° F., sheeted, diced, and compression molded into samples 2 ins × 2 ins square and an average thickness of 0.073 in. The sample was then subjected to a test in which a high energy dart (23 lbs) with an initial impact velocity of 133 ins/sec was used at 21° C. with a 1 inch retainer ring.

For comparison, essentially identical squares were compression molded from the Geon 87426 PVC alone, used as one control sample, and from Geon 87426 PVC (80 parts) and Kane Ace B-22 (20 parts), a commercially available impact modifier for PVC.

The following Table I sets forth the notched Izod impact data of the samples, indicating a substantial increase due to the presence of the comb terpolymer.

TABLE 1

| Sample | Izod impact (ft-lb/in) |
| --- | --- |
| 17A - Geon$^R$ 87426 PVC only | 0.8 |
| 17B - Geon$^R$ 87426 PVC + 20 parts Kane Ace B-22 | 15.8 |
| 17C - Geon$^R$ 87426 PVC + 20 parts n-BtA-EtA/PCL | 14. |

The following Table 2 presents data for the instrumented drop tester.

TABLE 2

| Sample | Max. force (lb) | Total Energy (in-lbs) | $E_i$* (in-lbs) | $E_p$ (in-lbs) |
| --- | --- | --- | --- | --- |
| 17A | 459 | 127 | 78 | 49 |
| 17B | 532 | 178 | 111 | 67 |
| 17C | 502 | 201 | 116 | 85 |

*$E_i$ = inititation energy, $E_p$ = propagation energy

Samples 17A and 17B showed higher scatter of data and greater standard deviation than the sample 17C. The high standard deviation is attributable to several factors including non-homogeneity or internal stresses in the samples. Both ductile and brittle failures were observed for samples 17A and 17B. Maximum force of impact is similar to that obtained with the commercial impact modifier (17B). The total impact energy $E_t$ which equals $E_i+E_p$ is slightly higher for sample 17C than that for 17B.

10 parts by weight of the comb terpolymer produced in Example 4 are blended with 90 parts of chlorinated poly(vinyl chloride) ("CPVC"), tin stabilizer and lubricant on a two-roll mill at 375° F.

The matrix base compound is blended with the following:

| Component | phr |
| --- | --- |
| CPVC designated by code 688X512 | 88 |
| Alastab 777 | 1.8 |
| AC 629 A | 1.5 |
| Stearic acid | 0.5 |
| Titanium dioxide | 5. |
| Impact modifier to be tested | 10. |

The sheeted blend is diced into pieces and injection molded into test specimens for testing. Control test samples are also injection molded using Paraloid KM-330 (a commercial impact modifier). The following results were obtained.

TABLE 3

| | w/comb terpolymer | w/Paraloid |
| --- | --- | --- |
| HDT, °C. annealed (264 psi, 0.125 inch) | 81 | 89 |
| Notched Izod, ft-lb/in | 1.2 | 2.0 |
| Reverse Notch Izod, ft-lb/in | 52 NB | 52 NB |
| Melt index, gm/10 min (205° C., 8700 gram load) | 15.8 | 13.8 |
| Specific gravity | 1.46 | 1.47 |

The lower HDT indicates better compatibility with CPVC than with the commercial impact modifier used. This better compatibility is also reflected in the slightly lower notched Izod, though the impact strength was improved relative to the CPVC without an impact modifier.

Having thus provided a general discussion, and specific illustrations of the best mode for preparing a comb copolymer of macromer of polylactone, and of macromers of block copolymers thereof, it is to be understood that no undue restrictions are to be imposed by reason thereof.

I claim:

1. An emulsion polymerization process for producing a comb copolymer of a polymerizable olefinically unsaturated monomer and a macromer of polylactone, the macromer having an unsaturated acryloyl or methacryloyl (together "(meth)acryloyl") head group at one end and a terminal group at the other, comprising,
   (a) preparing in a premix vessel, an aqueous non-acidic premix comprising a first surfactant and in the absence of a co-solvent,
   (b) preparing in a reaction vessel, an aqueous non-acidic reactor precharge comprising a redox catalyst and second surfactant, different from the first surfactant, and an electrolyte in an amount sufficient to maintain a desirable ionic charge balance in the absence of a co-solvent,
   (c) dissolving a macromer of polylactone having a mol wt greater than 1000 in the monomer only, to form a solution of macromer in monomer, the amount of monomer being sufficient to provide on average at least 2 repeating units of monomer(s) per macromer unit in the comb copolymer to be formed, and adding said solution to said premix while agitating and purging said premix vessel with an inert gas,
   (d) adding a minor portion by volume of said premix to said reaction vessel,
   (e) initiating polymerization in the absence of a chain transfer agent, by adding sequentially to said reaction vessel a surfactant, reducing agent, oxygen scavenger and hydroperoxide catalyst ineffective at a temperature less than 70° C. in the absence of said redox catalyst,
   (f) adding remaining premix in incremental quantities to said reaction vessel until polymerization is essentially completed while maintaining the contents of said reaction vessel in an emulsion at a temperature less than 70° C.,
   (g) coagulating said emulsion with a salt to produce a coagulum of comb copolymer, and,
   (h) recovering the comb copolymer having a porosity less than 0.1 and pendant chains of substantially equal length.

2. The process of claim 1 wherein said macromer has an ethylenically unsaturated functional group near one end and a hydroxyl group at the other, and said non-acidic reaction medium has a pH in the range from 6 to 8, and said polymerization proceeds by free radical polymerization maintaining the terminal OH group of each pendant polylactone-containing chain with insignificant thermal self-polymerization of the (meth)acrylic head group.

3. The process of claim 2 wherein said pendant chains are derived from said macromer having a molecular weight distribution Mw/Mn less than 3.

4. The process of claim 3 wherein said macromer is derived from a lactone having the structure:

(L)

wherein, n is an integer chosen from 1, 3, 4 and 5;
  $R^1$ is a group selected from hydrogen, $C_1-C_{20}$alkyl, cycloalkyl, alkoxy and phenyl, and the number of $R^1$ groups which are H is at least (n+2); and is provided with a single (meth)acrylyl head-containing group, so as to have the structure

(LM)

wherein R represents

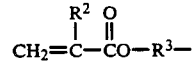

wherein $R^2$ is H or methyl;
  $R^3$ is selected from the group consisting of a bond, branched or linear alkylene, haloalkylene, alkoxyl, haloalkoxyl, each $C_1-C_{20}$, aralkylene, haloaralkylene, aralkoxyl, and haloaralkoxyl, each $C_7-C_{20}$;
  Z represents a terminal group of the macromer;
  M represents the polyester repeating unit of at least one said lactone which is ring-opened, and,
  m represents an integer in the range from 2 to about 500.

5. The process of claim 4 wherein said lactone is selected from the group consisting of epsilon-caprolactone, beta-propiolactone, beta-butyrolactone, and deltavalerolactone.

6. The process of claim 5 wherein said head group is the residue of 2-hydroxyethyl (meth)acrylate, hydroxypropyl (meth)acrylate or and 4-hydroxybutyl (meth)acrylate.

7. The process of claim 3 wherein Z represents a terminal group selected from —OH, —OR$^4$, —OCR$^4$, —OSiR$^4$, —Cl, —Br, —I, —OCH$_2$CH$_2$CN, —OSO$_3$Na, —OSO$_3$K, —OSO$_3$Li, and —OOSNH$_4$; wherein R$^4$ is selected from the group consisting of C$_1$-C$_{20}$ alkyl and haloalkyl, and C$_6$-C$_{20}$ aryl and aralkyl.

8. The process of claim 7 wherein said comb copolymer is represented by the structure

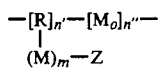

wherein n' is an integer in the range from 2 to 100;
n" is an integer ranging from 2 to 10$^4$;
—M$_o$—represents a repeating unit derived from said olefinically unsaturated monomer which is selected from the group consisting of
(i) C$_2$-C$_{12}$ vinyl monomers;
(ii) C$_8$-C$_{16}$ styryl monomers;
(iii) alpha,beta-ethylenically unsaturated carboxylic acids having from 3 to 8 carbon atoms, and derivatives thereof selected from the group consisting of esters of C$_1$-C$_{20}$ alcohols, and, metal salts thereof;
(iv) C$_4$-C$_8$ diene monomers
(v) C$_5$-C$_{14}$ cycloalkene; and,
(vi) a macromer of a polydienes, polystyrene, polyether, and derivatives thereof.

9. The process of claim 8 wherein said macromer and its pendant chain is represented by the structure

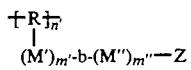

wherein b represents "block" and each block (M')$_{m'}$ and (M")$_{m''}$ represents a polylactone or a polyether except that both cannot be polyether.

10. A suspension polymerization process for producing a comb copolymer of a polymerizable olefinically unsaturated monomer and a macromer of polylactone, the macromer having an unsaturated acryloyl or methacryloyl (together "(meth)-acryloyl") head group at one end and a terminal group at the other, comprising,
(a) preparing in a reaction vessel, an aqueous non-acidic premix comprising a suspension agent in an amount sufficient to maintain a dispersion of microspheres of said monomer and macromer, and a first alkali metal-containing base, in the absence of a co-solvent,
(b) agitating said premix while adding a solution of said macromer in said polymerizable monomer, the amount of monomer being sufficient to provide on average, at least 2, repeating units of monomer per macromer unit in the comb copolymer to be formed,
(c) adding a free radical catalyst effective at a temperature below about 70° C. in an amount sufficient to form the comb copolymer at a temperature less than 70° C., and initiating polymerization in the absence of a chain transfer agent, and,
(e) recovering the polymer in an essentially non-porous form having pendant chains of substantially equal length.

* * * * *

UNITED STATES PATENT AND TRADEMARK OFFICE
CERTIFICATE OF CORRECTION

PATENT NO. : 5,061,772
DATED : October 29, 1991
INVENTOR(S) : Simon H. Yu

It is certified that error appears in the above-identified patent and that said Letters Patent is hereby corrected as shown below:

Column 10, line 35, the formula should read:

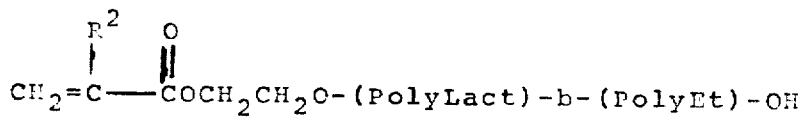

In claim 6, line 3, delete "and".

In claim 7, line 1, change "3" to --4--; and line 3, after the formula "-OCR⁴" insert the formula

In claim 8, line 6, "—M_o—" should read --  --.

Signed and Sealed this

Twenty-ninth Day of June, 1993

Attest:

MICHAEL K. KIRK

Attesting Officer   Acting Commissioner of Patents and Trademarks